US006802236B1

(12) United States Patent
Richardson

(10) Patent No.: US 6,802,236 B1
(45) Date of Patent: Oct. 12, 2004

(54) SYSTEM FOR IN-STRIDE IDENTIFICATION OF MINELIKE CONTACTS FOR SURFACE COUNTERMEASURES

(75) Inventor: Sam Richardson, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/351,753

(22) Filed: Jan. 21, 2003

(51) Int. Cl.[7] ............................................... B63G 9/00
(52) U.S. Cl. ....................................... 89/1.13; 102/402
(58) Field of Search ........................... 89/1.13; 102/402, 102/403

(56) References Cited

U.S. PATENT DOCUMENTS

| 5,598,152 A | * | 1/1997 | Scarzello et al. | ........... 340/850 |
| 5,844,159 A | * | 12/1998 | Posseme et al. | ............. 89/1.13 |
| 6,612,244 B1 | * | 9/2003 | Grosch et al. | ............... 102/402 |

FOREIGN PATENT DOCUMENTS

| EP | 0 534 496 A2 | * | 3/1993 | ................. 89/1.13 |
| GB | 2 215 281 A | * | 9/1989 | ................. 89/1.13 |
| JP | 405201385 A | * | 8/1993 | ................. 89/1.13 |

* cited by examiner

*Primary Examiner*—Stephen M. Johnson
(74) *Attorney, Agent, or Firm*—James T. Shepherd; Donald G. Peck

(57) ABSTRACT

A mine identification system includes a surface ship with console and display screen. An untethered unmanned underwater vehicle (UUV) has a video camera and high-resolution sonar providing high-resolution images for the screen, a transducer/transceiver projecting acoustic signals representative of the high-resolution signals through water and receiving acoustic control signals from the console. A search-sonar and acoustic transducer are connected to the ship, console, and screen. The search sonar projects acoustic signals and receives portions of the projected acoustic signals that are reflected from mine-like contacts and UUV. The screen displays low resolution images of mine-like contacts and UUV from the reflected portions, and the acoustic transducer transmits the acoustic control signals from the console through the water to the transducer/transceiver for quickly vectoring UUV to the vicinity of the mine-like contacts to enable identification of mines from high-resolution images.

12 Claims, 4 Drawing Sheets

SYSTEM FOR IN-STRIDE IDENTIFICATION OF MINELIKE CONTACTS FOR SURFACE COUNTERMEASURES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to mine countermeasures. More particularly, this invention is to a system having untethered, unmanned underwater vehicles for identifying mine-like contacts in an area suspected as being mined as a surface ship proceeds through the area.

The process for hunting mines is considerably slow. Ships making the search normally proceed on the detection phase of the mission at speeds ranging from three to five knots. Next, the classification phase of the process can, on average, range from five to fifteen minutes per contact depending on the location of the contact, the time it takes to slow and maneuver the ship, and the time it takes for a sonar operator on the ship to make a decision regarding classification. For contacts classified as mine-like, the subsequent identification and neutralization phase can, on average, range anywhere from fifteen to thirty minutes per contact depending on the time it takes for reacquisition and whether or not the contact is a mine requiring neutralization. Other time and risk factors that may need to be added-in include the time for reacquisition between each phase of the operation and the probabilities of reacquisition.

These steps of the process for hunting mines are repeated again and again as the ships make contacts of other suspected mines across an area. The greatest consequence of this concatenated process is that an inordinate amount of time can elapse. This loss of time spent checking suspected contacts that were not in fact caused by the presence of real mines can waste a significant military opportunity, or detrimentally change a tactical scenario.

Thus, in accordance with this inventive concept, a need has been recognized in the state of the art for a system having untethered, unmanned underwater vehicles deployed from a ship while under way to positively identify mines from mine-like contacts in less time.

OBJECTS AND SUMMARY OF THE INVENTION

An object of the invention is to provide a system to reduce the time spent during countermeasures missions for hunting mines.

Another object of the invention is to provide a mine identification system quickly and directly identifying mines.

Another object is to provide a mine identification system using a ship under way through an area having mine-like contacts for quickly and directly identifying mines and other objects from mine-like contacts.

Another object of the invention is to provide a mine identification system using at least one untethered unmanned underwater vehicle sent from a ship to identify real mine contacts and avoid unnecessary use of mine neutralization devices.

Another object is to provide a mine identification system using at least one untethered, unmanned underwater vehicle deployed from a ship under way for identifying real and false mine contacts in less time.

Another object of the invention is to provide a system using at least one expendable, untethered, unmanned underwater vehicle sent from a ship to eliminate the time for classification and to directly identify contacts while the ship is still under way.

These and other objects of the invention will become more readily apparent from the ensuing specification when taken in conjunction with the appended claims.

Accordingly, the present invention is to a mine identification system having at least one untethered, unmanned underwater vehicle (UUV) deployed from a surface ship to identify mines from many mine-like contacts in less time and avoid unnecessary use of mine neutralization devices. The surface ship has a command console and display screen, and the UUV has a video camera and high-resolution sonar providing high-resolution images for the screen, a transducer/transceiver for projecting acoustic signals representative of the high-resolution signals through water and for receiving acoustic control signals from the command console. A search-sonar and acoustic transducer are connected to the ship, command console, and display screen. The search sonar projects acoustic signals and receives portions of the projected acoustic signals that are reflected from the mine-like contacts and the UUV. The screen displays low resolution images of mine-like contacts and UUV from the reflected portions, and the acoustic transducer transmits the acoustic control signals from the command console through the water to the transducer/transceiver for quickly vectoring UUV to the vicinity of the mine-like contacts to enable identification of mines from the high-resolution images.

DESCRIPTION OF THE PREFERRED EMBODIMENTS

Figure 1:
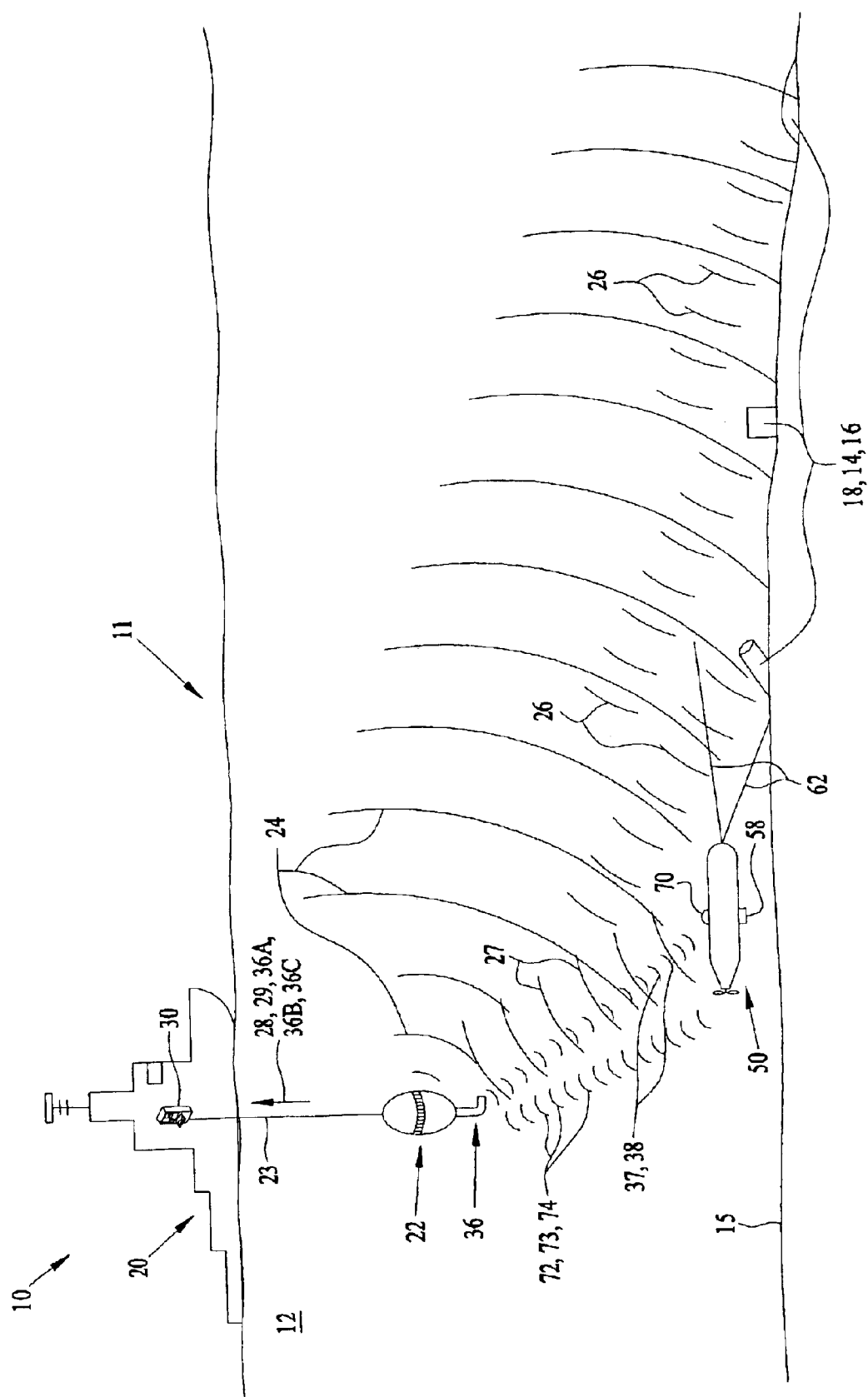
FIG. 1 is a schematic representation of the in-stride identification system of the invention showing surface ship, search/detection sonar, command console, and one untethered, unmanned underwater vehicle approaching a mine-like contact.
Figure 2:
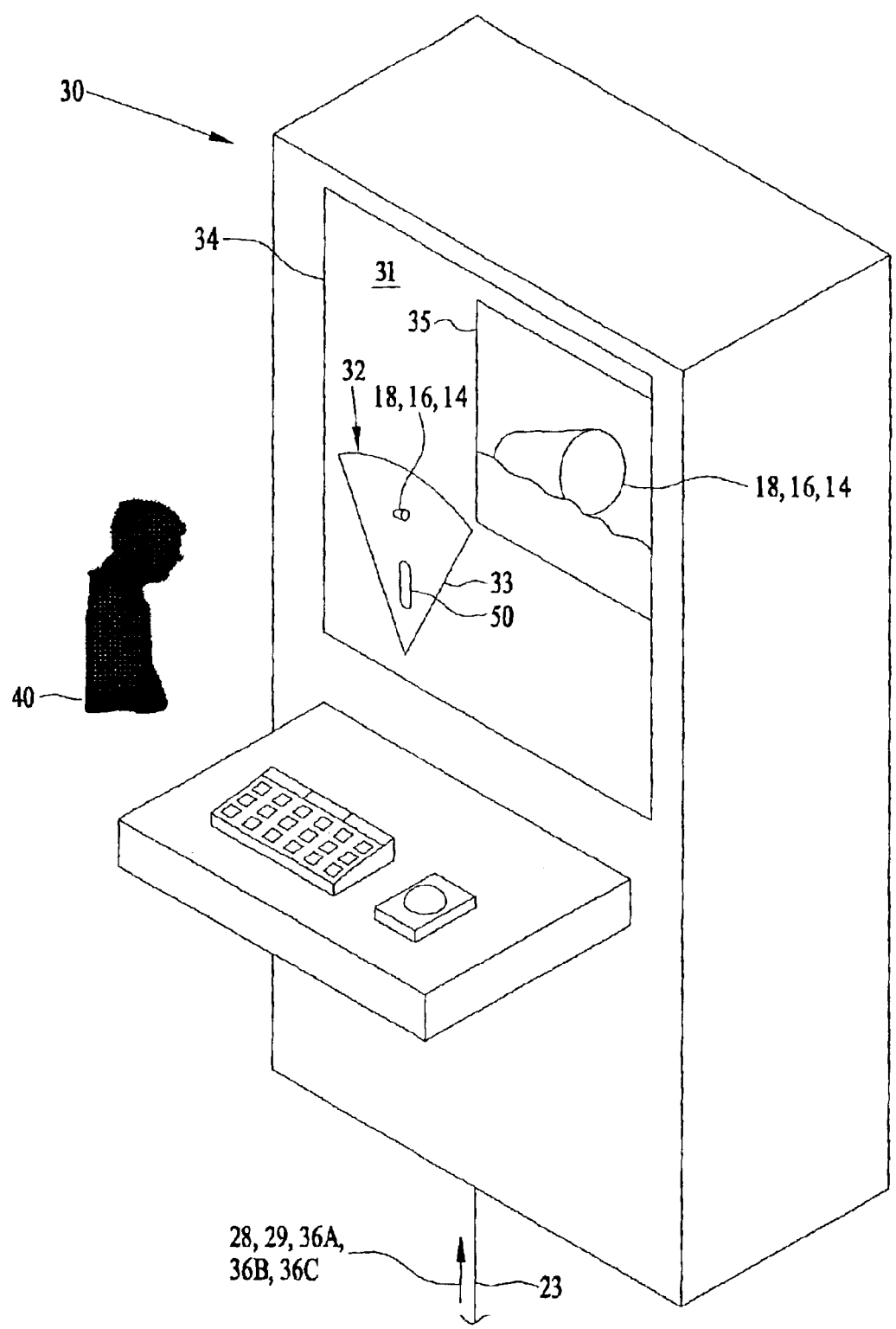
FIG. 2 is a schematic representation of a command console with a typical display.

Referring to FIGS. 1 and 2, mine identification system 10 of the invention is capable of positively identifying objects of interest from a far greater number of other objects in less time than conventional systems. Mine identification system 10 avoids further time consuming and wasteful deployments of more costly and complicated systems used for the neutralization of mines that otherwise would have to check many suspected contacts that were not mines.

Mine identification system 10 of the invention includes a surface ship 20 that can proceed underway through a suspected mined area 11 of a body of water 12 while the identification process is on-going. A search/detection, or search-sonar 22, for example the sonar known as SQQ-32, can be suspended in or towed through water 12 by cable 23 from ship 20. Search-sonar 22 projects acoustic signals 24 over a significant range extending hundreds of meters across area 11.

Portions 26 of the projected acoustic signals 24 can be reflected from mines 14 (or other object of interest) on, above, and possibly in bottom 15 of water 11, as well as many other objects 16 that are mine-like, e.g., metal and other jetsam and debris, outcroppings, topographical anomalies, etc., and reflected acoustic signal portions 26 are received at search sonar 22. Other portions 27 of the projected acoustic signals 24 can be reflected from an untethered unmanned underwater vehicle (UUV) 50, and reflected acoustic signal portions 27 are received at search sonar 22. From received, reflected acoustic signal portions 26, 27 search-sonar 22 generates representative contact signals (shown as arrow 28, 29) that are coupled over cable 23 to command console 30 of ship 20 and displayed as mine-like contact 18 and UUV 50, respectively on screen 31.

Search-sonar 22 utilizes projected acoustic signals 24 and reflected acoustic signal portions 26, 27 at frequencies chosen to be effective to be able to travel distances through water 12 and locate mines 14 and UUV 50. In other words, signals 24, 26, 27 are transmitted/received over the significant range. However, representative contact signals 28, 29 coupled to screen 31 of command console 30 will produce images 32 on section 33 of such low resolution that they are incapable of indicating exactly what has been located. In other words, images 32 are of such low resolution that both mines 14 and objects 16 appear as mine-like contacts 18 that could be mines 14 or any of many other objects 16. UUV 50 also is not clearly defined but this degree of clarity is enough to steer it to the vicinity of mine-like contact 18.

Figure 3:
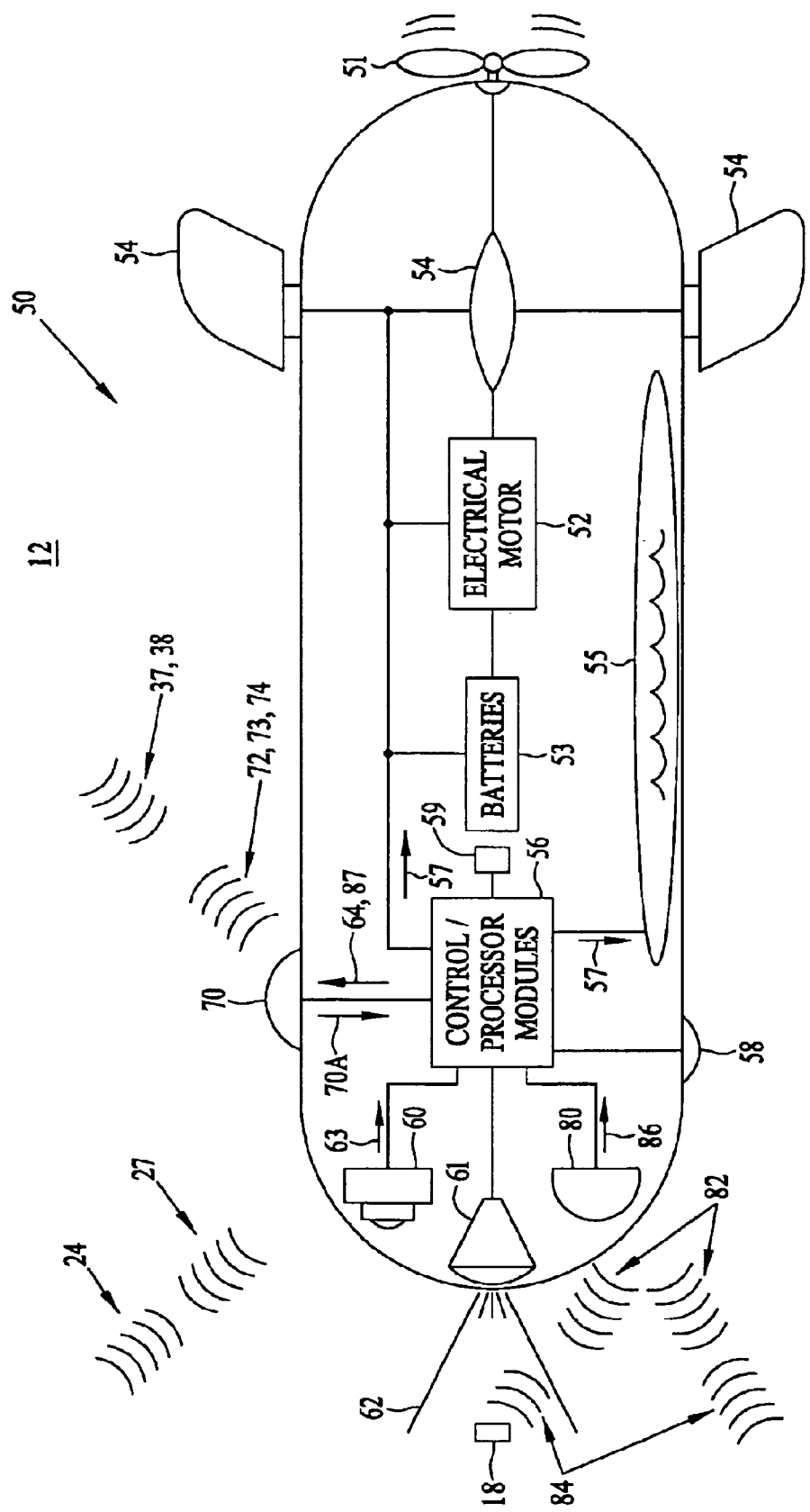
FIG. 3 is a schematic representation of constituents of a typical untethered unmanned underwater vehicle.

Referring also to FIG. 3, based on the information of images 32 from reflected acoustic signal portions 26, 27 an unmanned, underwater vehicle (UUV) 50 is sent out from ship 10 into the vicinity of mine-like contact 18 in area 11 for creating high-resolution images 34 on high-resolution section 35 of screen 31. In this context the term vicinity extends to the effective distance the high-resolution sensors on UUV 50 (to be described below) can effectively gather data for high-resolution images 34. High-resolution images 34 give operator 40 the needed information to make positive identification of mine-like contacts 18 as being mines 14 or other objects 16.

UUV 50 is free-swimming and not tethered to ship 20 and has a propeller 51 driven by electrical motor 52 connected to batteries 53 for submerged propulsion through water 12. Control fins 54 and ballasting chamber 55 steer and maneuver torpedo-shaped UUV 50 over the distance from ship 20 to each mine-like contact 18 and aid its recovery when appropriately actuated by a control/processor module 56. UUV 50 has an acoustic transducer/transceiver 70 to establish a two-way acoustic modem between ship 20 and UUV 50 for controlling and vectoring UUV 50.

A video camera 60 on UUV 50 is used to positively identify mine-like contacts 18 within the limits of visibility in ambient water 12. A high-intensity light source 61 adjacent to video camera 60 can illuminate mine-like contacts 18 in a cone-shaped beam, or sector 62 so that video signals (shown as arrow 63) from camera 60 can remove any doubt as to exactly what the contacts are. Control/processor module 56 receives video signals 63 and feeds representative video data signals (shown as arrow 64) to acoustic transducer/transceiver 70. Transceiver 70 transmits acoustic signals 72 representative of video data signals 64 to acoustic transducer 36 located adjacent to search-sonar 22. Transducer 36 feeds video data signals (shown as arrow 36A) representative of acoustic signals 72 over cable 23 to screen 31 of command console 30. The information of video data signals 36A is displayed as high-resolution images 34 on high-resolution section 35 of screen 31 where they enable positive identification of mine-like contacts 18 as mines 14 or other objects 16.

UUV 50 has a short range, high-resolution sonar 80 activated by control/processor module 56 to project acoustic signals 82 at higher frequencies than search-sonar 22. Sonar 80 is relatively short ranged, in the neighborhood of about a few meters, and may be used in conjunction with video camera 60, particularly when visibility in water 12 prevents effective use of camera 60. The higher-frequency acoustic signals 82 are projected a few meters in water 12, and within this range, portions 84 of acoustic signals 82 are reflected from mine-like contact 18. From reflected acoustic signal portions 84, high-resolution sonar 80 generates representative higher-frequency contact signals (shown as arrow 86) that are coupled to control/processor module 56.

Module 56 feeds representative acoustic data signals (shown as arrow 87) of high-frequency contact signals 86 to acoustic transceiver 70. Transceiver 70 transmits acoustic signals 73 that are representative of acoustic data signals 87 through water 12 to transducer 36, and transducer 36 generates representative acoustic data signals (shown as arrow 36B) and connects them over cable 23 to command console 30. The information of acoustic data signals 36B is displayed as high-resolution images 34 on high-resolution section 35 of screen 31 where they help enable positive identification of mines 14 or objects 16.

Transceiver 70 also can function as a transponder when acoustic signals 24 from search sonar 22 or acoustic control signals 37 from transducer 36 that originate in command console 30 impinge on it to radiate acoustic transponder signals 74 indicative of the location of UUV 50 to acoustic transducer 36. Transducer 36 generates responder data signals (shown as arrow 36C) from responder signals 74 and couples signals 36C over cable 23 to console 30 for display or other use.

Acoustic transceiver 70 also can receive acoustic control signals 38 from acoustic transducer 36 and generate responsive control signals (shown as arrow 70A) that are fed to control/processor module 56. Acoustic control signals 38 can be commands issued from ship 20 via command console 30 that cause module 56 to send driving signals (shown as arrow 57) to motor 52, batteries 53, fins 54 and chamber 55. Driving signals steer and maneuver UUV 50 to mine-like contacts 18. Acoustic control signals 38 can be derived from the information of any signals from UUV 50, or from portions 27 of projected acoustic signals 24 that were reflected from UUV 50 as it makes its way through mined area 11.

Figure 4:
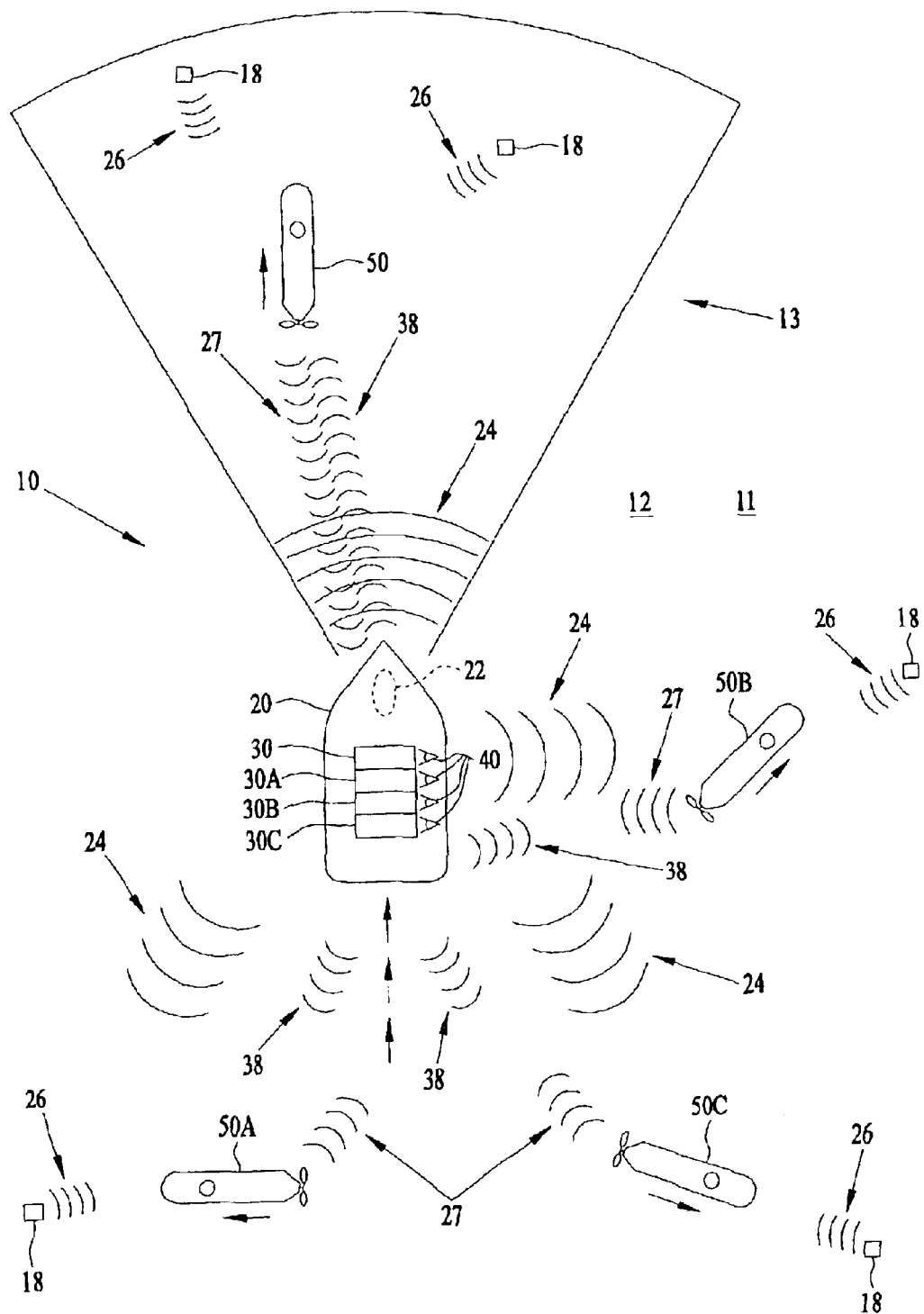
FIG. 4 is a schematic representation of the system of the invention showing more that one untethered, unmanned underwater vehicles simultaneously making identifications of mine-like contacts while the ship is underway.

Referring also to FIG. 4, mine identification system 10 can identify multiple mine-like contacts 18 as ship 20 continues underway through a suspected mined area 11 that may extend several or many kilometers. Search sonar 22 can project acoustic signals 24 omnidirectionally or in sequential sectors about the same size as forward sector 13 to locate multiple mine-like contacts 18 via reflected signals 26 and to locate UUV 50 via reflected signals 27 as UUV 50 and ship 20 proceeds through area 11. Multiple untethered UUVs 50 50A, 50B, 50C, etc. are deployed from ship 20 and multiple operators 40 each associated with a command console 30 30A, 30B, 30C, etc. on ship 20 vector each UUV with acoustic control signals 38 to mine-like contacts 18 in response to reflected acoustic signals 26, 27 and data signals from each UUV as described above.

Since all the UUVs of system 10 the invention are untethered, ship 20 can proceed unimpeded through area 11 to eliminate the encumbrances associated with active tethers (electronic or optical) otherwise used to transmit power and data between conventional submerged vessels and a support ship. System 10 of the invention also avoids complications that deployment and recovery of such active tethers entail.

The frequency bands of acoustic signals transmitted through water 12 between ship 20 and any or all of UUV 50, 50A, 50B, 50C are different from one another and different from acoustic signals 24, 26 and 27 of search-sonar 22 to avoid interference among them. Optionally, the signals of sonar 22, all acoustic transceivers 70, and all transducers 36, can be time division multiplexed to prevent interference.

Many, if not most of mine-like contacts 18 are not mines and after an investigation of one contact each UUV can proceed to the next one in response to command signals 38 from ship 20. After all contacts have been checked, control processor modules 56 can activate ballast chambers 55 of UUV 50, 50A, 50B, 50C to blow ballast water and float them to the surface for recovery and reuse.

When, however, a particular mine-like contact 18 is identified as mine 14, UUV 50 can release a transponder, or pinger 58 at mine 14. Pinger 58 emits acoustic beacon signals after a timed delay or in response to a remotely originating interrogation signal. Acoustic beacon signals help an explosive-laden mine neutralization vehicle (not shown) launched from ship 20 find mine 14. UUV 50 of the invention can approach and inspect a suspected mine contact very closely for positive identification. When a pinger 58 is used by several UUVs, they each emit beacon signals at different frequencies to avoid confusing mine neutralization vehicles that will arrive later. The loss of an investigating UUV due to inadvertent detonation of mine 14 can be tolerated since they are made to be relatively inexpensive. In fact the cost effectiveness of UUV 50 makes it expendable. An explosive charge 59 in UUV 50 can be detonated for self destruction, or charge 59 can be exploded next to the last inspected mine 14.

Having the teachings of this invention in mind, modifications and alternate embodiments of mine identification system 10 may be adapted without departing from the scope of the invention. UUV 50 could have different combinations of sensor packages and communication systems as well as other navigational systems. However, care must be taken when making such modifications since costs could rise to unacceptable levels as compared to the cost-effective, reliable UUV of system 10 of this invention. Mine identification system 10 of the invention supports an operational concept to speed up the classification and identification portions of the mission, by utilizing UUV 50 to perform identification and localization of detected sonar contacts. Most importantly, no lives are endangered or lost.

The disclosed components and their arrangements as disclosed herein, all contribute to the novel features of this invention. Mine identification system 10 assures reliable positive identification of mines 14 and other objects 16 from multiple mine-like contacts 18 using untethered UUV 50 in less time and without undue restriction of a support ship 20. Therefore, mine identification system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A mine identification system comprising:
   a surface ship having a command console and display screen, said ship proceeding through a suspected mined area;
   an unmanned underwater vehicle having a video camera and high-resolution sonar to provide high-resolution signals for said display screen, a transducer/transceiver for projecting acoustic signals representative of said high-resolution signals through ambient water and for receiving acoustic control signals from said command console, and said unmanned underwater vehicle being untethered from said surface ship; and
   a search-sonar and an acoustic transducer connected to said ship, said command console, and said display screen, said search sonar projecting acoustic signals and receiving portions of said projected acoustic signals reflected from mine-like contacts and said unmanned underwater vehicle in said water, said display screen displaying low resolution signals of said mine-like contacts and said unmanned underwater vehicle from said reflected portions, and said acoustic transducer transmitting said acoustic control signals from said command console through said water to said transducer/transceiver for vectoring said unmanned underwater vehicle to the vicinity of said mine-like contacts.

2. The mine identification system of claim 1 wherein said unmanned underwater vehicle includes a control/processor module coupled to said video camera, said high-resolution sonar, and said transducer/receiver to receive high-resolution data in said vicinity of said mine-like contacts from said video camera and high-resolution sonar and transmit it as representative acoustic signals by said transducer/receiver to said acoustic transducer.

3. The mine identification system of claim 2 wherein said representative acoustic signals are displayed on a high-resolution section of said screen to allow positive identification of mines from said mine-like contacts.

4. The mine identification system of claim 3 wherein said unmanned underwater vehicle includes a motor, batteries, fins and ballasting chamber connected to said control/processor module to steer said unmanned underwater vehicle in response to said acoustic control signals from said command console to said mine-like contacts.

5. The mine identification system of claim 4 wherein said transducer/transceiver on said unmanned underwater vehicle operates as a transponder when said projected acoustic signals from said search-sonar impinge on it to radiate acoustic transponder signals to said acoustic transducer to indicate the location of said unmanned underwater vehicle.

6. The mine identification system of claim 5 wherein said transducer/transceiver on said unmanned underwater vehicle operates as a transponder when acoustic control signals from acoustic transducer impinge on it to radiate acoustic transponder signals to said acoustic transducer to indicate the location of unmanned underwater vehicle.

7. The mine identification system of claim 6 wherein said unmanned underwater vehicle is deployed from said surface ship to investigate one of said mine-like contacts to enable positive identification of a mine while said surface ship proceeds under way through said area.

8. The mine identification system of claim 7 wherein a plurality of unmanned underwater vehicles are deployed at the same time from said surface ship to separately investigate different ones of said mine-like contacts while said surface ship proceeds under way through said area.

9. The mine identification system of claim 7 further comprising:
   a pinger released from said unmanned underwater vehicle next to an identified mine for emitting acoustic beacon signals.

10. The mine identification system of claim 8 further comprising:
    a pinger for each of said plurality of unmanned underwater vehicles, each pinger emitting beacon signals at different frequencies to avoid confusion.

11. The nine identification system of claim 9 further comprising:

a charge in said unmanned underwater vehicle for self destruction.

12. The mine identification system of claim 10 further comprising:

a charge in each unmanned underwater vehicle for self destruction.

* * * * *